United States Patent
Maede et al.

(10) Patent No.: US 12,395,739 B2
(45) Date of Patent: Aug. 19, 2025

(54) ACTUATOR DRIVER, CAMERA MODULE USING THEREOF, AND ELECTRONIC DEVICE

(71) Applicant: ROHM CO., LTD., Kyoto (JP)

(72) Inventors: Jun Maede, Kyoto (JP); Kuniyuki Kubo, Kyoto (JP); Hiroyuki Kondo, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 348 days.

(21) Appl. No.: 18/078,596

(22) Filed: Dec. 9, 2022

(65) Prior Publication Data
US 2023/0199312 A1    Jun. 22, 2023

(30) Foreign Application Priority Data
Dec. 17, 2021    (JP) .................................. 2021-205226

(51) Int. Cl.
*H04N 23/68* (2023.01)
*H04N 23/54* (2023.01)
*H04N 23/55* (2023.01)

(52) U.S. Cl.
CPC ........... *H04N 23/687* (2023.01); *H04N 23/54* (2023.01); *H04N 23/55* (2023.01); *H04N 23/6812* (2023.01)

(58) Field of Classification Search
CPC ...... H04N 23/687; H04N 23/54; H04N 23/55; H04N 23/6812; H04N 23/57; H04N 23/6815; G03B 5/00; G03B 30/00
See application file for complete search history.

(56) References Cited

U.S. PATENT DOCUMENTS

| | | | | |
|---|---|---|---|---|
| 7,536,091 | B2 * | 5/2009 | Nomura | G03B 17/00 359/557 |
| 9,167,161 | B1 * | 10/2015 | Tam | H04N 23/68 |
| 2013/0314810 | A1 * | 11/2013 | Sekimoto | G02B 7/023 359/823 |
| 2015/0350507 | A1 * | 12/2015 | Topliss | H04N 23/687 348/208.2 |
| 2015/0350549 | A1 * | 12/2015 | Gregory | H04N 23/57 348/208.5 |
| 2016/0007017 | A1 * | 1/2016 | Nishikawa | H04N 23/687 348/187 |
| 2016/0070115 | A1 * | 3/2016 | Miller | G03B 5/02 359/557 |
| 2016/0073027 | A1 * | 3/2016 | Noguchi | H04N 23/6812 348/208.6 |
| 2018/0184005 | A1 * | 6/2018 | Morotomi | H04N 23/6812 |
| 2019/0191090 | A1 * | 6/2019 | Murashima | H04N 23/685 |
| 2022/0191398 | A1 * | 6/2022 | Tabuchi | H04N 23/687 |

FOREIGN PATENT DOCUMENTS

WO    2015178083 A1    11/2015

* cited by examiner

*Primary Examiner* — Chiawei Chen
(74) *Attorney, Agent, or Firm* — CANTOR COLBURN LLP (57) ABSTRACT

The present disclosure provides an actuator driver for driving an actuator that is configured to position a movable part of an image stabilization mechanism. The actuator driver includes a control unit and a driving unit. The control unit is, in a first mode, configured to generate a control signal according to a position command, and in a second mode, configured to generate the control signal thereby the movable part contacts a mechanical end. The driving unit is configured to drive the actuator according to the control signal.

15 Claims, 8 Drawing Sheets

ACTUATOR DRIVER, CAMERA MODULE USING THEREOF, AND ELECTRONIC DEVICE

CROSS REFERENCE TO RELATED APPLICATIONS

The present invention claims priority under 35 U.S.C. § 119 to Japanese Application No. 2021-205226, filed Dec. 17, 2021, the entire content of which is incorporated herein by reference.

TECHNICAL FIELD

The disclosure relates to an actuator driver and a camera module using the same.

BACKGROUND

In recent years, optical image stabilization (OIS) used in camera modules mounted in electronic devices such as smartphones continues to progress. A camera module with image stabilization includes an image sensor, a lens (referred to as an image stabilization lens) capable of moving within an XY plane parallel to an imaging surface of the image sensor, an actuator for positioning the lens, and an actuator driver that controls the actuator. If blur is detected by a blur detection mechanism such as a gyroscope sensor, the actuator driver drives the actuator to move the lens so as to cancel out the blur.

PRIOR ART DOCUMENT

Patent Publication

[Patent publication 1] International Publication WO 2015/178083

SUMMARY

Problems to be Solved by the Disclosure

According to research results for camera modules having optical image stabilization (OIS), applicants discovered following issues.

In recent years, enlargement of image sensors continues to make advancement. Accompanied by the above, sizes and even qualities of image stabilization lenses have also increased. If a greater vibration is applied to an electronic device, a lens may have a larger inertia and may not follow image stabilization, resulting in collision of a movable part of the lens and a mechanical end. If the collision between the movable part and the mechanical occurs repeatedly, abnormal noises are generated. Moreover, there is a concern of degraded reliability due to mechanical collisions.

The disclosure is completed in view of the above, and an exemplary object thereof is to provide an actuator driver capable of inhibiting collisions between the movable part and the mechanical end.

Technical Means for Solving the Problem

According to an aspect of the disclosure, an actuator driver for driving an actuator that is configured to position a movable part of an image stabilization mechanism is provided. The actuator driver includes: a control unit, in a first mode, configured to generate a control signal according to a position command, and in a second mode, configured to generate the control signal thereby the movable part contacts a mechanical end; and a driving unit configured to drive the actuator according to the control signal.

A camera module according to an aspect of the disclosure includes: an image sensor; an actuator for positioning a movable part including an image stabilization mechanism; and an actuator driver for driving the actuator. The actuator driver, in a first mode, drives the actuator thereby correcting image stabilization, and in a second mode, drives the actuator thereby the movable part contacts a mechanical end.

Moreover, any combination of the above constituent elements, and replacement and substitution of the constituent elements or expressions between methods, devices, systems and the like also effectively serve as embodiments of the disclosure. Moreover, the description of the item (methods for solving the problem) may not include all essential features of the disclosure, and therefore sub-combinations describing these features are also be encompassed within the scope of the disclosure.

Effects of the Disclosure

Collisions between the movable part and the mechanical end can be effectively inhibited according to the disclosure.

DETAILED DESCRIPTION OF THE EMBODIMENTS

Summary of Embodiments

A summary of several exemplary embodiments of the disclosure is given below. The summary serves as the preamble of the detailed description to be given shortly and aims to provide fundamental understanding of the embodiments by describing several concepts of one or more embodiments in brief. It should be noted that the summary is not to be construed as limitations to the scope of the application or disclosure. The summary is not a comprehensive summary of all conceivable embodiments, nor does it intend to specify important elements of all embodiments or to define the scope of a part of or all aspects. For the sake of better description, "one embodiment" sometimes refers to one embodiment (an implementation example or a variation example) or multiple embodiments (implementation examples or variation examples) described in the disclosure.

In one embodiment, an actuator driver for driving an actuator that is configured to position a movable part of an image stabilization mechanism is provided. The actuator driver includes: a control unit, in a first mode, configured to generate a control signal according to a position command, and in a second mode, configured to generate the control signal thereby the movable part contacts a mechanical end; and a driving unit configured to drive the actuator according to the control signal.

According to the above configuration, by selecting the second mode, the movable part can be pressed to the mechanical end, thereby inhibiting repeated collisions between the movable part and the mechanical end.

In one embodiment, the control unit may switch to the second mode when a vibration satisfying a predetermined condition is detected. When a vibration exceeds a control threshold of the actuator in the first mode, image stabilization is suspended and the second mode is selected, thereby preventing a collision between the movable part and the mechanical end.

In one embodiment, the control unit may switch to the second mode regardless of whether there is a vibration. Thus, the movable part can be fixed in advance for a future vibration. For example, the second mode can be selected by an operation mode of an electronic device equipped with the camera module or by a user instruction.

In one embodiment, in the first mode, the control unit is configured to generate the control signal through a feedback thereby a feedback signal indicating the position of the movable part approaches the position command.

In one embodiment, in the second mode, the control unit is configured to fix the control signal to a predetermined value. That is to say, by switching from feedback control to open-loop control, the actuator generates a large force, and the movable part can be pressed to the mechanical end.

In the second mode, the control unit is capable of fixing the position command at a position beyond the mechanical end. That is to say, in the second mode, the feedback control can be maintained instead of having to switch to the open-loop control. By setting the position command at a position beyond the mechanical end, an error between the feedback signal and the position command is kept to be non-zero, and so the magnitude of the control signal increases. Thus, by causing the actuator to generate a larger force, the movable part can be pressed to the mechanical end.

In one embodiment, in the second mode, the control unit is configured to bring the movable part into contact with one of two mechanical ends present at one axis along a direction of gravity. Thus, the actuator can use the gravity to press the movable part to the mechanical end with a smaller force, hence reducing current consumption in the second mode. Alternatively, if the force generated by the actuator is the same, the force that can press the movable part to the mechanical end is increased by the part of the gravity.

In one embodiment, the actuator driver is operable in the second mode when a camera is in a non-activated state. Thus, even when a camera is not in use and an electronic device is vibrating, repeated collisions between the movable part and the mechanical end can be inhibited.

In one embodiment, the actuator driver is integrated onto a single semiconductor substrate. The term "integrated" includes a situation in which all constituent elements of a circuit are formed on a substrate, or a situation in which main constituent elements of the circuit are integrated; alternatively, a part of resistors or capacitors may be arranged outside the substrate and be used to adjust circuit constants. By integrating circuits onto one chip, the circuit area is reduced and characteristics of circuit elements are guaranteed uniform.

A camera module according to one embodiment includes: an image sensor; an image stabilization lens disposed on an incident optical path to the image sensor; an actuator for positioning a movable part of the image stabilization lens; and the actuator driver in any items described above.

A camera module according to one embodiment includes: an image sensor; an actuator for positioning a movable part of an image stabilization mechanism; and an actuator driver for driving the actuator. The actuator driver, in a first mode, drives the actuator to thereby correct image stabilization, and in a second mode, drives the actuator for the movable part to contact a mechanical end.

Embodiments

Details of the preferred and appropriate embodiments are given with reference to the accompanying drawings below. The same or equivalent constituent elements, parts and processes in the accompanying drawings are represented by the same denotations, and repeated description is omitted as appropriate. Moreover, the elements are illustrative and are non-limiting to the disclosure. All features and combinations thereof described in the embodiments are not necessarily intrinsic characteristics of the disclosure.

In the description of the application, an expression "a state of component A connected to component B" includes, in addition to a situation where component A and component B are physically and directly connected, a situation where component A is indirectly connected to component B via another component, without the another component resulting in substantial influences on their electrical connection or impairing functions or effects exerted by their connection.

Similarly, an expression "a state of component C disposed between component A connected to component B" further includes, in addition to a situation where component A and component B, or component B and component C are directly connected, an indirect connection via another component, without the indirect connection resulting in substantial influences on their electrical connection or impairing functions or effects exerted by their connection.

Figure 1:
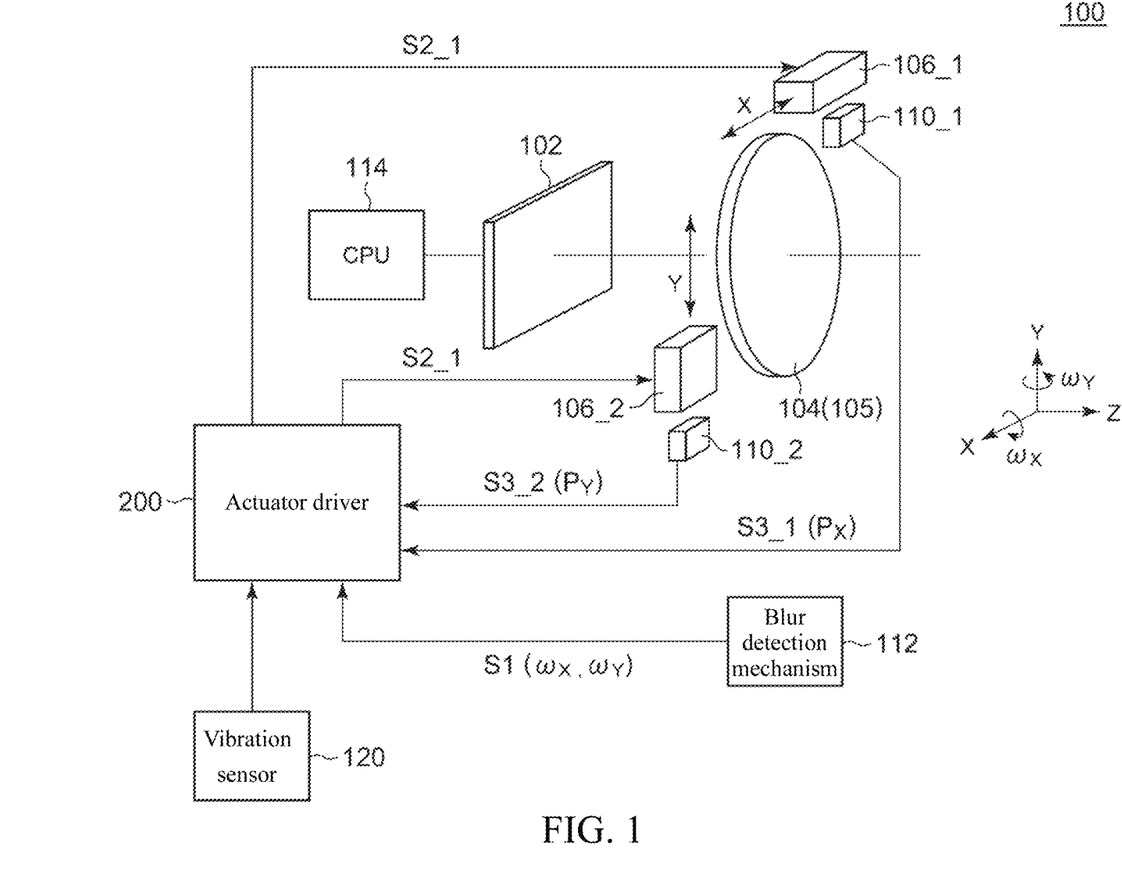
FIG. 1 is a block diagram of a camera module having an optical image stabilization function.

FIG. 1 shows a block diagram of a camera module having an image stabilization function. The camera module 100 includes an image sensor 102, an image stabilization lens 104, a first actuator 106_1, a second actuator 106_2, an actuator driver 200, position detection units 110_1 and 110_2, a blur detection mechanism 112, and a central processing unit (CPU) 114. In addition to the above components, the camera module 100 further includes a lens for auto focusing and an actuator, which are however omitted from FIG. 1.

For better understanding, a direction of an optical axis of the image stabilization lens 104 is set as the Z axis. Moreover, a left-right direction of the orientation of the camera module 100 in FIG. 1 is set as the X axis, and a top-down direction is set as the Y axis. The X axis is also expressed as a first axis and the Y axis is expressed as a second axis.

The image stabilization lens 104 is disposed on an incident optical path to the image sensor 102. The image sensor 102 is a complementary metal oxide semiconductor (CMOS) sensor or a charge coupled device (CCD) and captures an image through the image stabilization lens 104.

The image stabilization lens 104 is supported in a state of being movable in the X direction and the Y direction within a plane (the XY plane) parallel to an imaging plane of the image sensor 102. The first actuator 106_1 positions the movable part 105 including the image stabilization lens 104 in the direction of the first axis (the X-axis direction), and the second actuator 106_2 positions the movable portion 105 in the direction of the second axis (the Y-axis direction). The first actuator 106_1 and the second actuator 106_2 are linear actuators, and are implemented by, for example, voice coil motors. In each of the direction of the first axis and the direction of the second axis, the movable range of the movable part 105 including the image stabilization lens 104 is mechanically restricted. An end portion of the movable range is referred to as a mechanical end. In the direction of the first axis, the mechanical end is present in each of the positive direction and the negative direction in the direction of the first axis, and the mechanical end is also present in each of the positive direction and the negative direction in the direction of the second axis.

The blur detection mechanism 112 detects blur of the camera module 100 and generates a blur detection signal S1 indicative of the blur. The blur detection mechanism 112 is, for example, a gyroscope sensor, and detects an angular velocity $\omega_X$ of the camera module 100 around the X axis, an angular velocity $\omega_Y$ around the Y axis, and an angular velocity $\omega_Z$ around the Z axis. By controlling the position of the image stabilization lens 104 in the X-axis direction, rotation (blur) around the Y axis can be corrected; by controlling the position of the image stabilization lens 104 in the Y-axis direction, rotation (blur) around the X axis can be corrected. The blur detection signal S1 includes at least the angular velocities $\omega_X$ and $\omega_Y$ of at least two axes.

The actuator driver 200 generates, based on the blur detection signal S1 detected by the blur detection mechanism 112, a target code (a position command) indicative of a target value of a displacement of the camera image stabilization lens 104 so as to cancel the blur. The actuator driver 200 generates driving signals S2_1 and S2_2 for the first actuator 106_1 and the second actuator 106_2 based on the target code generated internally, respectively. The actuator 106_1 (where I=1 or 2) positions the image stabilization lens 104 according to the corresponding driving signal S2_1.

During image stabilization, feedback control (closed-loop control) is utilized because the image stabilization lens 104 needs to be positioned precisely. The position detection units 110_1 and 110_2 generate position detection signals S3_1 and S3_2 indicative of a position (a displacement amount) PX of the image stabilization lens 104 in the direction of the first axis and a position (a displacement amount) PY of the image stabilization lens 104 in the direction of the second axis, respectively. The position detection units 110 are implemented by, for example, Hall sensors.

The vibration sensor 120 is provided to detect a vibration of the camera module 100. The vibration detected by the vibration sensor 120 is used to switch an operation mode of the actuator driver 200.

The camera module 100 is operable in two modes, namely, a first mode and a second mode.

The first mode is the usual image stabilization mode. In the first mode, the actuator driver 200 drives the first actuator 106_1 and the second actuator 106_2 to perform image stabilization. More specifically, in the first mode, the actuator driver 200 performs feedback control on the driving signal S2_1 to coincide the position $P_X$ of the image stabilization lens 104 indicated by the first position detection signal S3_1 with a target position $P_{X(REF)}$ indicated by the target code. Similarly, the actuator driver 200 performs feedback control on the driving signal S2_2 to coincide the position $P_Y$ of the image stabilization lens 104 indicated by the second position detection signal S3_2 with a target position $P_{Y(REF)}$ indicated by the target code.

In the second mode, the actuator driver 200 does not perform image stabilization, but drives the first actuator 106_1 and the second actuator 106_2 to contact the movable part 105 including the image stabilization lens 104 with the mechanical end.

The configuration of the camera module 100 is as described above. The operation of the camera module 100 is to be described below.

Figure 2:
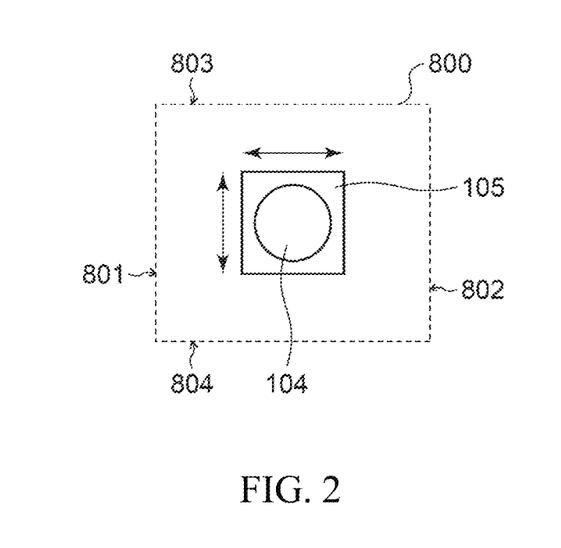
FIG. 2 is a diagram of operation of the camera module in FIG. 1 in a first mode.

FIG. 2 shows a diagram of the operation of the camera module 100 in FIG. 1 in the first mode. The dotted line 800 indicates the movable range of the movable part 105 including the image stabilization lens 104. End portions 801 and 802 in the direction of the first axis (the X-axis direction) of the movable range are equivalent to mechanical ends. Similarly, end portions 803 and 804 in the direction of the second axis (the Y-axis direction) of the movable range are equivalent to mechanical ends.

As described above, the actuator driver 200, in the first mode, positions the movable part 105 including the image stabilization lens 104 in the X-axis direction and the Y-axis direction within the movable range 800 to cancel out the blur detected by the blur detection mechanism 112.

Figure 3:
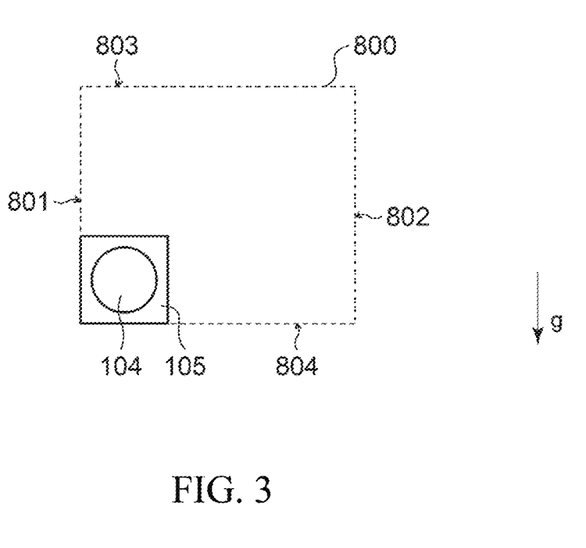
FIG. 3 is a diagram of the operation of the camera module in FIG. 1 in a second mode.

FIG. 3 shows a diagram of the operation of the camera module 100 in FIG. 1 in the second mode. In the second mode, the movable part 105 is pressed to the mechanical ends 801 and 804. Thus, even when a vibration is applied to the camera module 100, repeated collisions between the movable part 105 and the mechanical ends 801 and 804 can be inhibited because the movable part 105 does not depart from the mechanical ends 801 and 804.

Herein, two mechanical ends 801 and 802 are present in the direction of the first axis (the X-axis direction), and two mechanical ends 803 and 804 are also present in the direction of the second axis (the Y-axis direction). The actuator driver 200 selectively drives one of the two mechanical ends 801 and 802 to press the movable part 105 to the selected one. Similarly, the actuator driver 200 selectively drives one of the two mechanical ends 803 and 804 to press the movable part 105 to the selected one.

The driver actuator 200 can select one of two mechanical ends present at one axis along a direction of gravity g for the movable part 105. In the example in FIG. 3, the mechanical end 804 is in the direction of the gravity g although two mechanical ends 803 and 804 are present in the direction of the second axis, and so the mechanical end 804 is selected. Thus, compared to a situation where the mechanical end 803 is selected, the second actuator 106_2 can use the gravity and thus press the movable part 105 to the mechanical end 804 with a smaller force, hence reducing current consumption in the second mode. Alternatively, if the force generated by the second actuator 106_2 is the same, the force that can press the movable part to the mechanical end is increased by the part of the gravity.

In the example in FIG. 3, neither of the two mechanical ends 801 and 802 in the direction of the first axis is preferred in terms of gravity, and so either can be selected.

Figure 4:
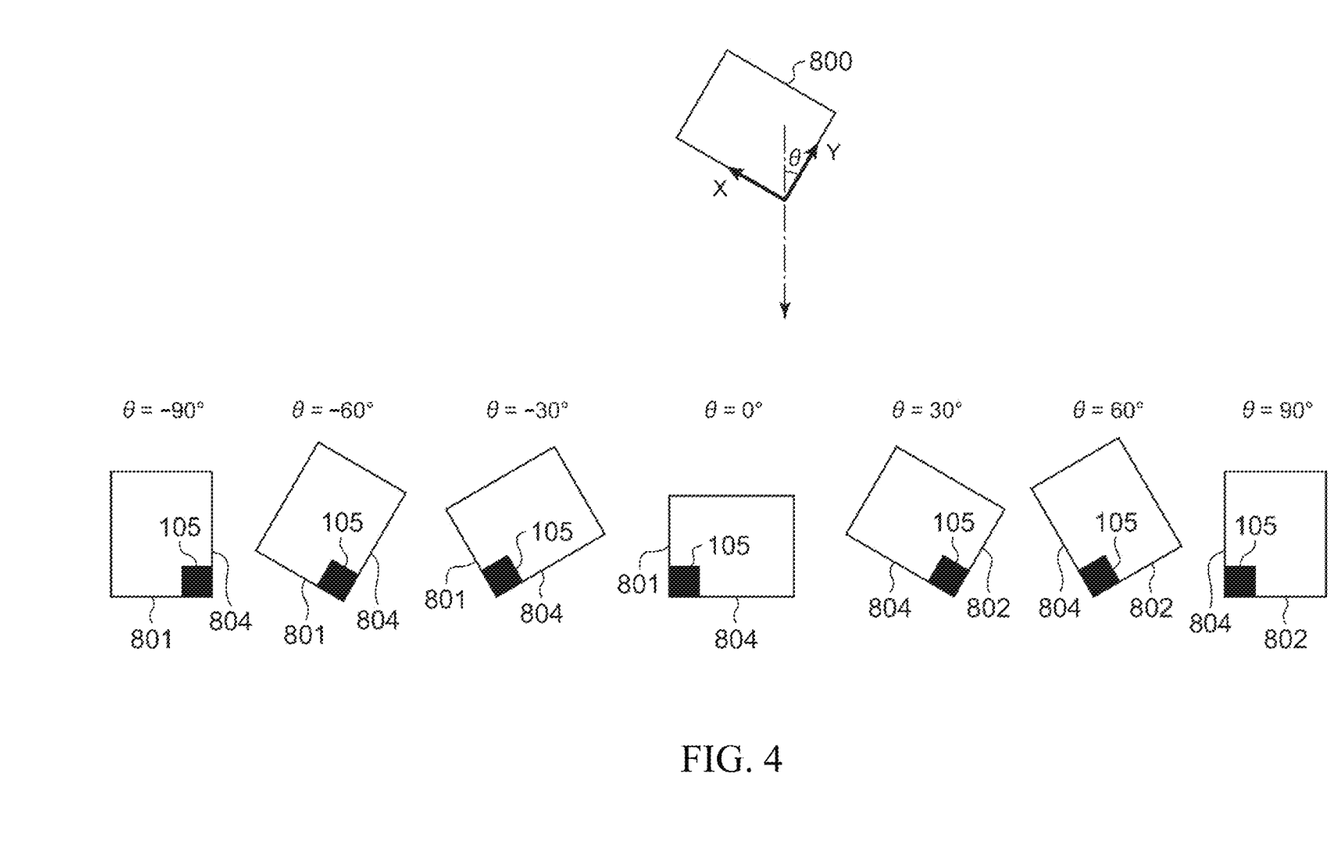
FIG. 4 is a diagram of an example of selection of a mechanical end based on the direction of gravity.

FIG. 4 shows a diagram of an example of selection of a mechanical end based on the direction of gravity. An angle formed by the Y axis and the direction of gravity is defined as θ. The value of θ varies within the range between −90° and +90°. The mechanical end 804 in the second axis (the Y direction) is constantly the direction of gravity.

On the other hand, in the first axis, the mechanical end to be selected varies depending on θ. That is to say, when θ>0°, the mechanical arm 802 is selected because the mechanical arm 802 is in the direction of gravity. Conversely, when θ<0°, the mechanical end 801 is selected because the mechanical arm 801 is in the direction of gravity.

Herein, when the slope θ0 of the camera module 100 exceeds 0° in the presence of a vibration, if the selected mechanical end alternates between the mechanical ends 801 and 802, the movable part 105 may collide with the mechanical ends 801 and 802 and such is inappropriate. Thus, positive and negative thresholds θ₊ and θ₋ can be defined to bring in hysteresis control. That is to say, when the mechanical end 801 is already selected, if θ>θ₊, the mechanical end 802 is selected; when the mechanical end 802 is already selected, if θ<θ₋, the mechanical end 801 is selected. Accordingly, when the slope θ of the camera module 100 exceeds 0° in the presence of a vibration, collisions caused by switching the mechanical ends can be prevented.

The various devices and methods that can be derived from the description of the disclosure are not limited to specific configurations. To help better understand or clarify essentials or circuit operations of the disclosure but not to narrow a scope of the disclosure, more specific configuration examples and variation examples are described below.

Figure 5:
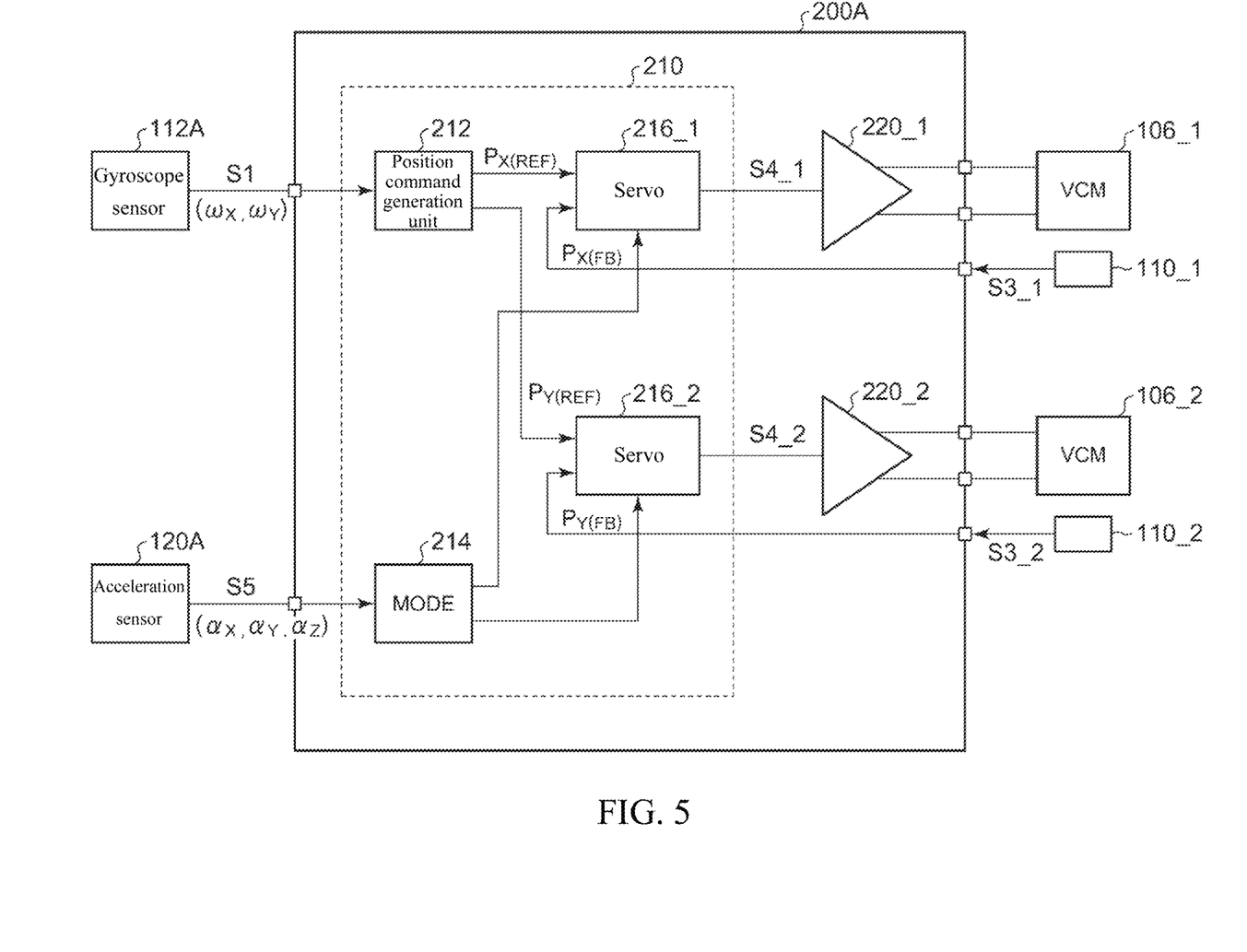
FIG. 5 is a block diagram of an actuator driver according to an embodiment.

FIG. 5 shows a block diagram of an actuator driver 200A according to an embodiment. The actuator driver 200A includes a control unit 210, a first driving unit 220_1 and a second driving unit 220_2. A gyroscope sensor 112A is the blur detection mechanism 112 in FIG. 1 and detects an angular velocity of the camera module 100. An acceleration sensor 120A is the vibration sensor 120 in FIG. 1 and detects an acceleration of the camera module 100.

The control unit 210 includes a command generation unit 212, a mode controller 214, a first servo controller 216_1 and a second servo controller 216_2.

In the first mode, the position command generation unit 212 receives a blur detection signal S1 generated by the gyroscope sensor 112A and generates position commands $P_{X(REF)}$ and $P_{Y(REF)}$ indicative of the position of the image stabilization lens 104 capable of canceling out the blur for the X axis and the Y axis, respectively. For example, the position command generation unit 212 generates the position command $P_{X(REF)}$ by integrating and multiplying the angular velocity $\omega_X$ around the X axis by a predetermined gain. Similarly, the position command generation unit 212 generates the position command $P_{X(REF)}$ by integrating and multiplying the angular velocity $\omega_Y$ around the Y axis by the predetermined gain.

The mode controller 214 receives an acceleration signal S5 generated by the acceleration sensor 120A and selects an operation mode of the actuator driver 200A. More specifically, the mode controller 214 detects, based on the acceleration signal S5, a vibration provided to the camera module 100. Moreover, the first mode or the second mode is selected according to whether the vibration satisfies a predetermined condition.

For example, the predetermined condition may be defined such that it can be determined whether the vibration is within a range that can be followed by the servo controller 216. The first mode is selected when the vibration is within a range that can be followed. Conversely, the second mode is selected when the vibration is beyond a range that can be followed.

Moreover, the mode controller 214 detects the direction of gravity based on the acceleration signal S5 generated by the acceleration sensor 120A and calculates the slope θ of the camera module 100. Moreover, based on the slope θ of the camera module 100, in the second mode, the mechanical end of the movable part 105 to be pressed is selected.

From the signal indicative of a mode provided by the mode controller 214 for the servo controllers 216_1 and 216_2, and in the second mode, the signal for selecting a mechanical end is indicated.

The first servo controller 216_1 is activated in the first mode and generates a control signal S4_1 to have an X-coordinate $P_{X(FB)}$ of the movable part 105 indicated in the position detection signal S3_1 generated by the position detection unit 110_1 approach the position command $P_{X(REF)}$ The first driving unit 220_1 generates the driving signal S2_1 corresponding to the control signal S4_1. The control signal S4_1 is, for example, a current command, and the first driving unit 220_1 provides a driving current having a current amount corresponding to the control signal S4_1 to the first actuator 106_1. Alternatively, the control signal S4_1 is, for example, a voltage command, and the first driving unit 220_1 provides a driving voltage having a voltage level corresponding to the control signal S4_1 to the first actuator 106_1.

Similarly, the second servo controller 216_2 is activated in the first mode and generates a control signal S4_2 to have a Y-coordinate $P_{Y(FB)}$ of the movable part 105 indicated in the position detection signal S3_2 generated by the position detection unit 110_2 approach the position command $P_{Y(REF)}$. The second driving unit 220_2 generates the driving signal S2_2 corresponding to the control signal S4_2.

The first servo controller 216_1 and the second servo controller 216_2 are disabled in the second mode. In the second mode, the servo controllers 216_1 and 216_2 fix the control signals S4_1 and S4_2 at predetermined values $A_1$ and $A_2$, respectively. The predetermined value $A_1$ has different values when the mechanical end 801 and the mechanical end 802 are selected. Similarly, the predetermined value $A_2$ has different values when the mechanical end 803 and the mechanical end 804 are selected.

Figure 6:
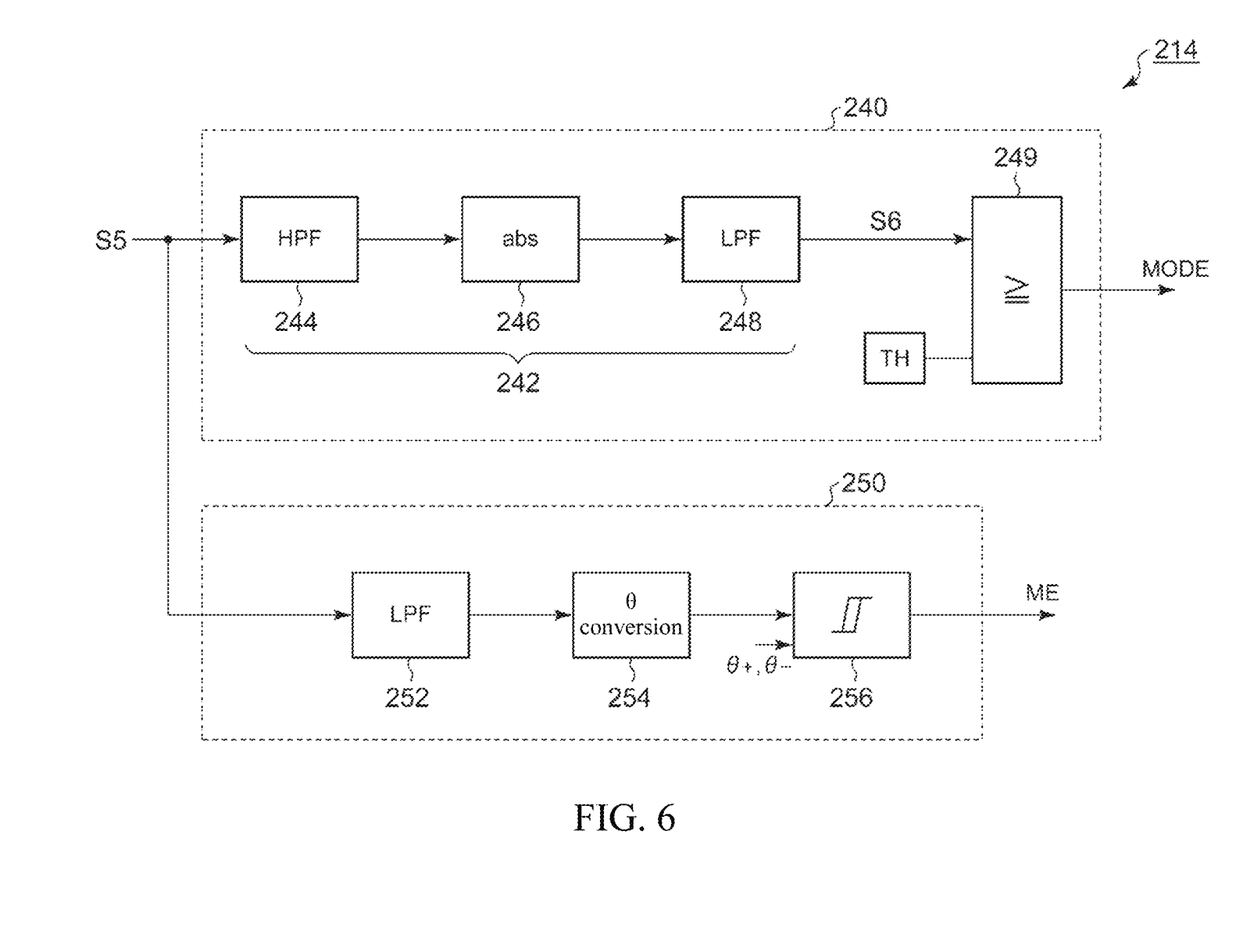
FIG. 6 is a block diagram of a configuration example of a mode controller.

FIG. 6 shows a block diagram of a configuration example of the mode controller 214. The mode controller 214 has a mode selector 240 and a mechanical end selection unit 250. The mode selector 240 determines, based on the acceleration signal S5, whether a vibration satisfying a predetermined condition is generated, and generates a mode control signal MODE.

The mode selector 240 in FIG. 6 determines whether an amplitude of the acceleration signal S5 exceeds a predetermined threshold. The mode selector 240 includes a full-wave rectifier 242 and a comparator 249. The full-wave rectifier 242 full-wave rectifies the acceleration signal S5 and generates a signal S6 indicative of the magnitude of the vibration. For example, the full-wave rectifier 242 may include a high-pass filter 244, an absolute value circuit 246 and a low-pass filter 248. The comparator 249 compares the magnitude S6 of the vibration with a threshold TH, and outputs the mode control signal MODE having a first value (for example, 1) corresponding to the first mode when S6<TH and the mode control signal MODE having a second value (for example, 0) corresponding to the second mode when S6>TH.

The mechanical end selection unit 250 determines the direction of gravity based on the acceleration signal S5 and selects a mechanical end of the movable part 105 to be pressed in the second mode. The mechanical end selection unit 250 includes, for example, a low-pass filter 252, a θ conversion unit 254 and a hysteresis comparator 256.

The low-pass filter 252 removes a high-frequency noise component from the acceleration signal S5. The θ conversion unit 254 detects the direction of gravity θ based on the acceleration signal S5 of the low-pass filter 252. More specifically, the accelerations $α_X$, $α_Y$ and $α_Z$ of the three axes included in the acceleration signal S5 are converted into angular information θ. The hysteresis comparator 256 compares the angle θ with a threshold to select a mechanical end. A mechanical end selection signal ME specifying a mechanical end and the mode control signal MODE are provided to the servo controllers 216_1 and 216_2 together.

Figure 7:
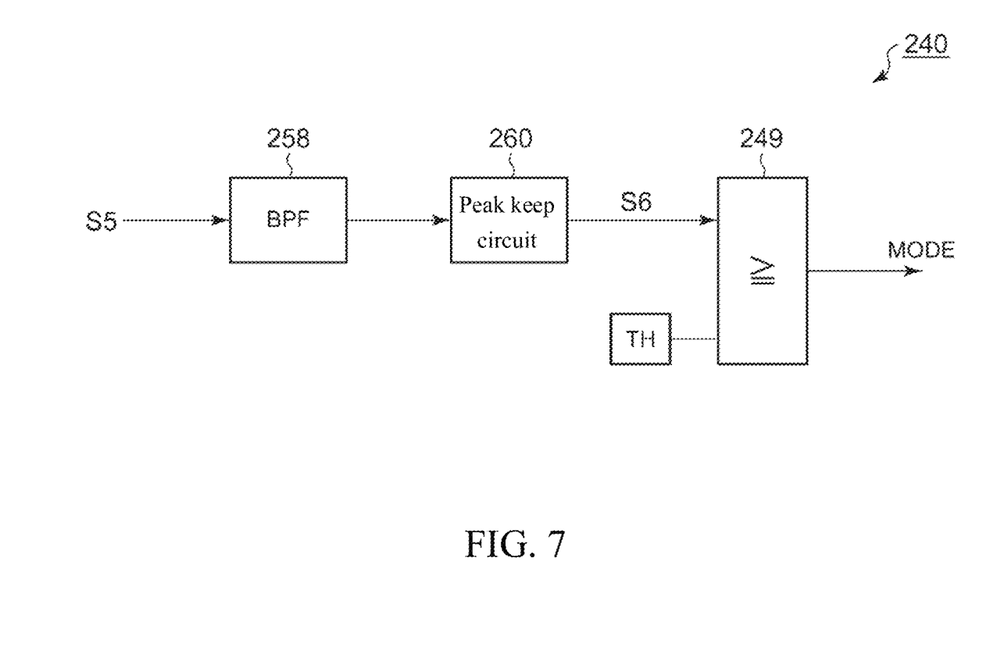
FIG. 7 is a block diagram of a variation example of a mode selector.

FIG. 7 shows a block diagram of a variation example of the mode selector 240. The mode selector 240 includes a band-pass filter 258, a peak keeping circuit 260 and a comparator 249. The band-pass filter 258 allows a predetermined band of the acceleration signal S5 to pass through. The peak keeping circuit 260 detects a peak value of a signal passing through the bandpass filter 258. An output signal S6 of the peak keep circuit 260 represents an amplitude of the vibration. The comparator 249 compares the magnitude S6 of the vibration with the threshold TH, and outputs the mode control signal MODE having a first value corresponding to the first mode when S6<TH and the mode control signal MODE having a second value corresponding to the second mode when S6>TH.

Figure 8:
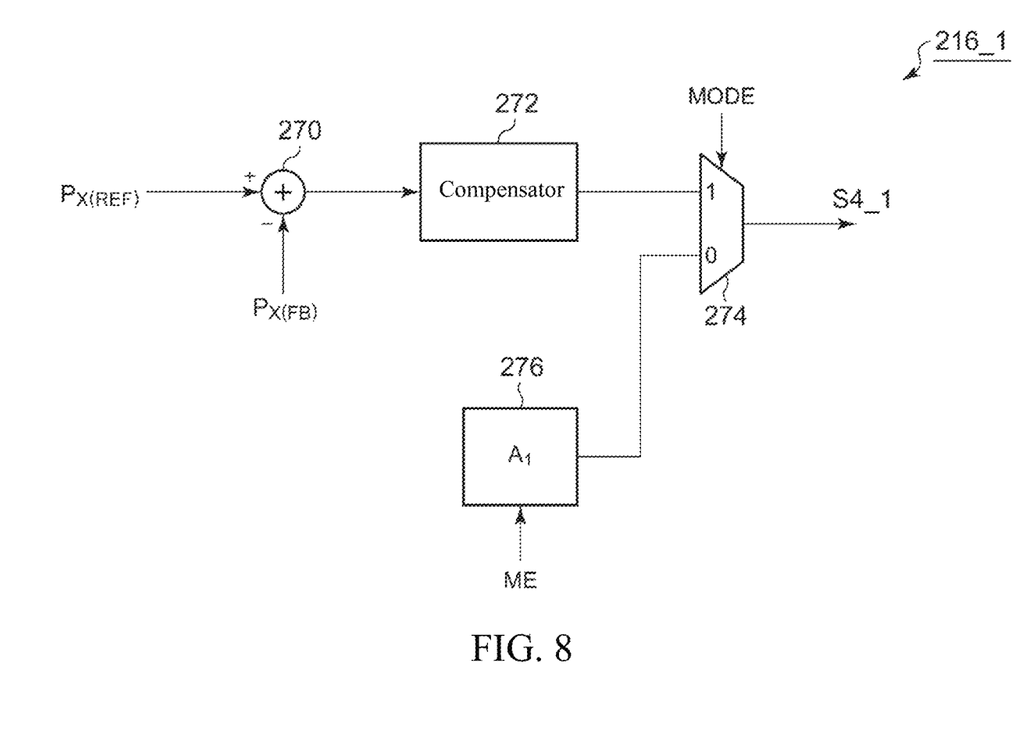
FIG. 8 is a block diagram of a configuration example of a first servo controller.

FIG. 8 shows a block diagram of a configuration example of the first servo controller 216_1. The first servo controller 216_1 includes an error detector 270, a compensator 272, a selector 274 and a fixed value generation unit 276.

The error detector 270 and the compensator 272 are effective in the first mode and generate the control signal S4_1 to have an error between the position command $P_{X(REF)}$ and the position feedback signal $P_{X(FB)}$ approach zero by means of feedback. The error detector 270 generates an error signal indicative of the error between the position command $P_{X(REF)}$ and the position feedback signal $P_{X(FB)}$. The compensator 272 is a proportional integration (PI) compensator or a proportional integration differentiation (PID) compensator and generates the control signal S4_1 by performing an operation using the error signal as an input.

In the second mode, the fixed value generation unit 276 outputs the predetermined value $A_1$ that becomes the value of the control signal S4_1. The fixed value generation unit 276 varies the predetermined value $A_1$ based on the mechanical end selection signal ME. For example, when a positive predetermined value is set to T, the value of $A_1$ can be switched by the two values T and −T based on the mechanical end selection signal ME.

The selector 274 selects an output of the compensator 272 when the mode control signal MODE is in a first value (1), and selects a predetermined value generated by the fixed value generation unit 276 when the mode control signal MODE is in a second value (0) and outputs the selected signal as the control signal S4_1.

The above is the configuration of the first servo controller 216_1. The second servo controller 216_2 is identically structured as the first servo controller 216_1.

According to the first servo controller 216_1 in FIG. 8, in the first mode, the movable part 105 can be positioned to a target position by means of servo control to thereby achieve image stabilization. Moreover, in the second mode, the control signal S4_1 is fixed by means of open-loop control, thereby pressing the movable part 105 to the mechanical end selected according to the direction of gravity.

While the embodiments are exemplary, a person skilled in the art would be able to understand that there are other various variation examples of combinations of the constituting elements and processes. Details of such variation examples are given in the description below.

Variation Example 1

Figure 9:
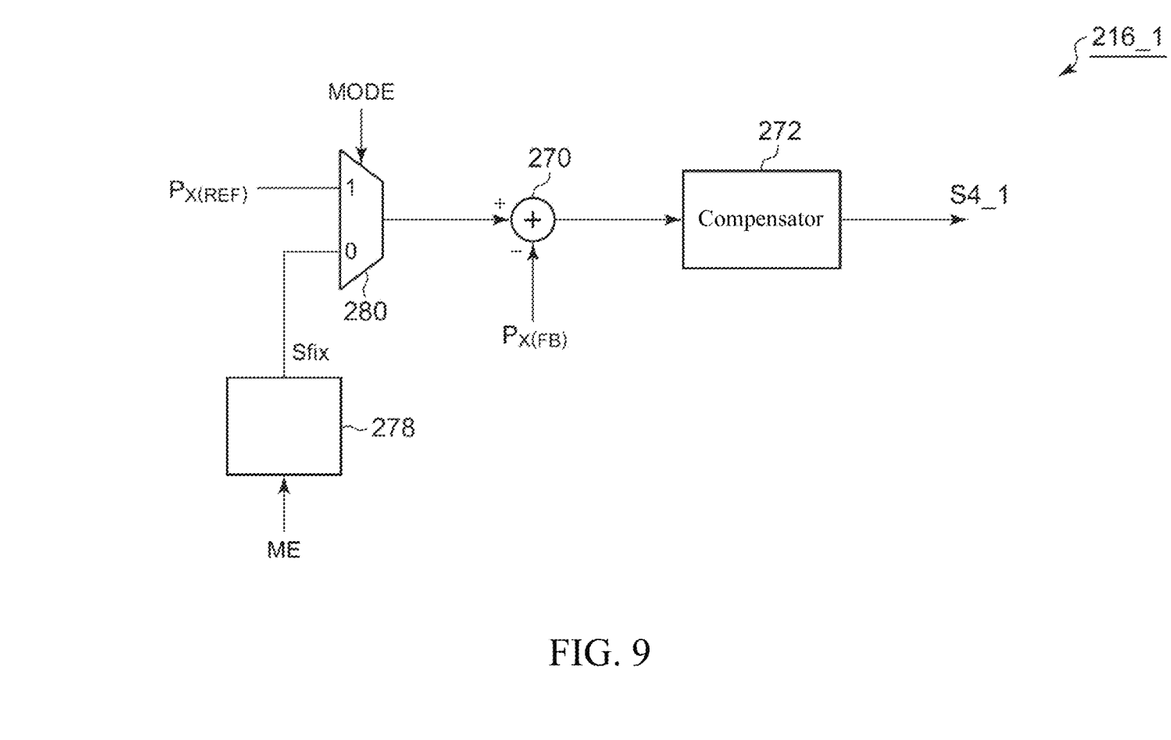
FIG. 9 is a block diagram of a first variation example of the first servo controller.

FIG. 9 shows a block diagram of a first variation example of the first servo controller 216_1. In the second mode, a fixed target position setting unit 278 generates a fixed value Sfix indicative of a target position of the movable part 105. The target position is defined to be outside the movable range of the movable part 105 in the X-axis direction. The fixed target position setting unit 278 outputs the fixed value Sfix in a first value specifying a position closer to an outer side than the mechanical end 801 when the mechanical end selection signal ME selects the mechanical end 801, and outputs the fixed value Sfix in a second value specifying a position closer to an outer side than the mechanical end 802 when the mechanical end selection signal ME selects the mechanical end 802.

The selector 280 selects the position command $P_{X(REF)}$ generated by the position command generation unit 212 when the mode control signal MODE is a first value (1) and selects the fixed value Sfix generated by the fixed value generation unit 278 when the mode control signal MODE is a second value (0).

The error detector 270 generates an error signal indicative of an error between an output of the selector 280 and the feedback signal $P_{X(FB)}$. The compensator 272 is a proportional integration (PI) compensator or a proportional integration differentiation (PID) compensator and generates the control signal S4_1 by performing an operation using the error signal as an input.

According to the first servo controller 216_1 in FIG. 9, in the first mode, the movable part 105 can be positioned to a target position by means of servo control to thereby achieve image stabilization. Moreover, in the second mode, although servo control is effective, the position command at this point is set at a position beyond the mechanical end, the error between the feedback signal $P_{X(FB)}$ and the position command Sfix is kept to be non-zero, and so the magnitude of the control signal S4_1 increases. Thus, by causing the first actuator 106_1 to generate a larger force, the movable part 105 can be pressed to the mechanical end.

Variation Example 2

In one embodiment, the actuator driver 200 automatically selects a mode based on an output of the vibration sensor 120; however, the disclosure is not limited to the above example. For example, the mode of the actuator driver 200 can be selected by an application processor of the camera module 100. That is to say, the application processor is capable of monitoring a vibration through the vibration sensor 120, selects the first mode when the vibration can be corrected through the actuator driver 200, and selects the second mode when the vibration cannot be corrected through the actuator driver 200. Alternatively, the selected mode can be specified by a user of an electronic device equipped with the camera module 100. For example, in a case of a user performing vigorous exercise while carrying the electronic device, selecting the second mode can prevent collisions between the movable and the mechanical end.

Variation Example 3

The second mode can be selected when the camera module 100 is in a non-activated state. In this case, the actuator driver 200 may also be activated by an application processor and becomes operable in the second mode. Thus, when a camera is not used and an electronic device is vibrating, repeated collisions between the movable part and the mechanical end can be inhibited.

Variation Example 4

In one embodiment, parallel displacement of an image stabilization lens and an image sensor is described as an image stabilization mechanism; however, the disclosure is not limited to the above example. For example, the disclosure may also be applied to an image stabilization mechanism that displaces an image sensor or an image stabilization mechanism using a prism.

Variation Example 5

In one embodiment, angular blur is used as a target for correction. However, displacement blur may also be corrected. Moreover, for detection of displacement blur, an acceleration sensor may be used in substitution for a gyroscope sensor. In this case, both a sensor for detecting displacement blur and a sensor for a vibration for mode control can both be applied. Conversely, a gyroscope sensor may be applied to detect a vibration used for mode control.

The invention claimed is:

1. An actuator driver for driving an actuator that is configured to position a movable part of an image stabilization mechanism, the actuator driver comprising:
a control unit,
in a first mode, configured to generate a control signal according to a position command,
and
in a second mode, configured to generate the control signal thereby the movable part contacts a mechanical end; and
a driving unit, configured to drive the actuator according to the control signal,
wherein the control unit switches to the second mode when a vibration satisfying a predetermined condition is detected.

2. The actuator driver of claim 1, wherein the control unit switches between the first mode and the second mode based on an output of an acceleration sensor.

3. The actuator driver of claim 2, wherein in the first mode, the control unit is configured to generate the control signal through a feedback thereby a feedback signal indicating the position of the movable part approaches the position command.

4. The actuator driver of claim 1, wherein in the first mode, the control unit is configured to generate the control signal through a feedback thereby a feedback signal indicating the position of the movable part approaches the position command.

5. The actuator driver of claim 4, wherein in the second mode, the control unit is configured to fix the control signal to a predetermined value.

6. The actuator driver of claim 4, wherein in the second mode, the control unit is configured to fix the position command at a position exceeding the mechanical end.

7. The actuator driver of claim 1, wherein in the second mode, the control unit is configured to bring the movable part into contact with one of two mechanical ends present at one axis along a direction of gravity.

8. The actuator driver of claim 1, wherein the actuator driver is operable in the second mode when a camera is in a non-activated state.

9. The actuator driver of claim 1, wherein the actuator driver is integrated on a single semiconductor substrate.

10. A camera module, comprising:
an image sensor;
an image stabilization lens, disposed on an incident optical path to the image sensor;
an actuator, for positioning a movable part including the image stabilization lens; and
the actuator driver of claim 1.

11. A camera module, comprising:
an image sensor;
an actuator, for positioning a movable part of an image stabilization mechanism; and
an actuator driver, for driving the actuator, wherein the actuator driver,
in a first mode, configured to drive the actuator thereby correcting image stabilization, and
in a second mode, configured to drive the actuator thereby the movable part contacts a mechanical end,
wherein the actuator driver switches to the second mode when a vibration satisfying a predetermined condition is detected.

12. The camera module of claim 11, wherein in the second mode, the actuator driver is configured to bring the movable part into contact with one of two mechanical ends present at one axis along a direction of gravity.

13. An electronic device, comprising the camera module of claim 12.

14. An electronic device, comprising the camera module of claim 11.

15. An actuator driver for driving an actuator that is configured to position a movable part of an image stabilization mechanism, the actuator driver comprising:
a control unit,
in a first mode, configured to generate a control signal according to a position command,
and
in a second mode, configured to generate the control signal thereby the movable part contacts a mechanical end; and
a driving unit, configured to drive the actuator according to the control signal,
wherein the control unit switches between the first mode and the second mode based on an output of an acceleration sensor.

* * * * *